Aug. 18, 1931.  W. H. KELLY  1,819,516
AUTOMOBILE VANITY CASE
Filed May 23, 1929
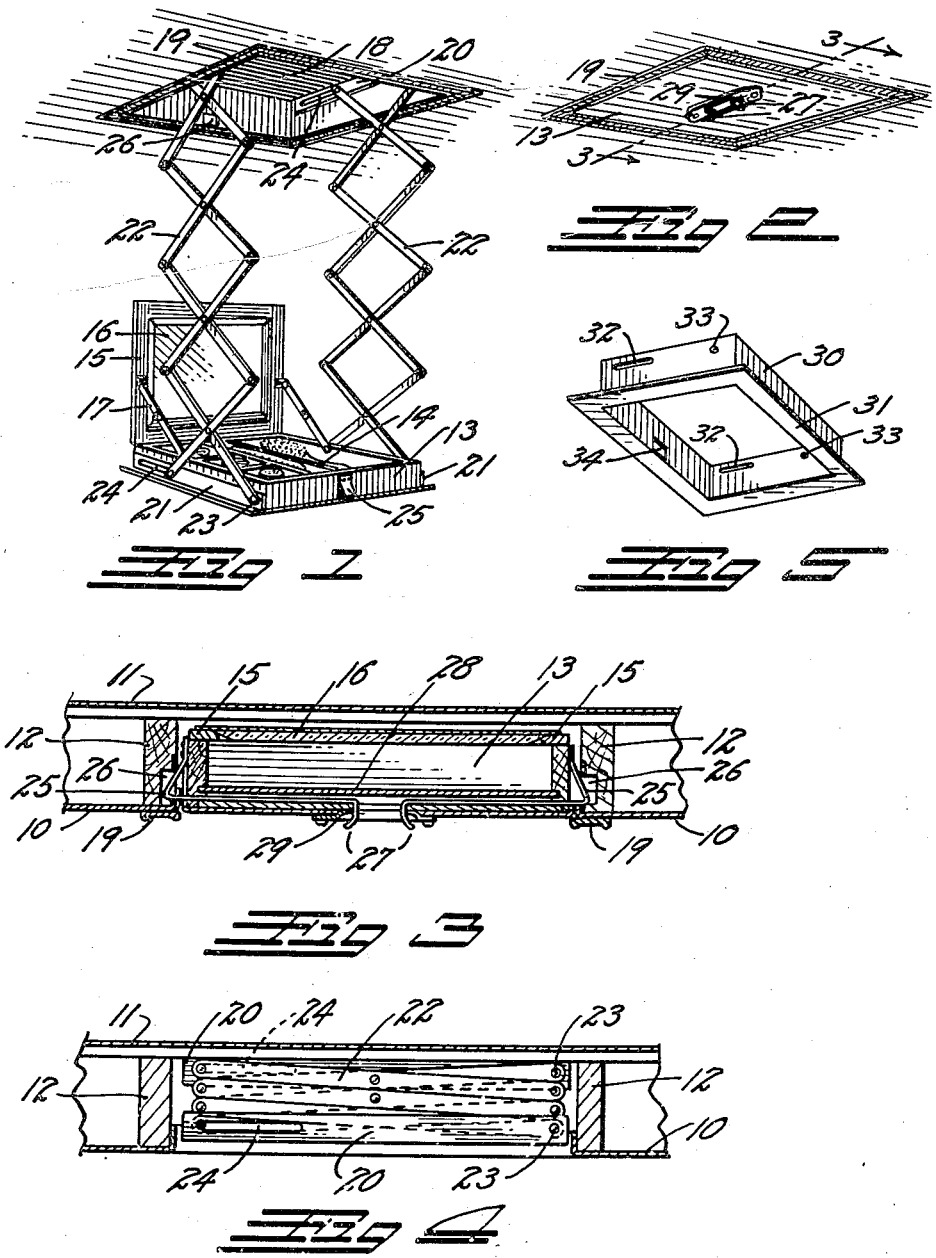

Patented Aug. 18, 1931

1,819,516

UNITED STATES PATENT OFFICE

WILLIAM H. KELLY, OF DENVER, COLORADO

AUTOMOBILE VANITY CASE

Application filed May 23, 1929. Serial No. 365,250.

This invention relates to a vanity case for automobiles and has for its principal object the provision of means for supporting a vanity case and mirror from the top of an automobile so that it can be quickly and easily lowered to a convenient position for use.

Another object of the invention is to so construct the case and its supporting mechanism that when not in use it will be entirely concealed within the top structure of the automobile out of the way of the passengers.

A further object of the invention is to provide means for locking the case in the closed position so as to maintain it rigidly in place without vibration or rattling.

Other objects and advantages reside in the detail construction of the invention, which is designed for simplicity, economy, and efficiency. These will become more apparent from the following description.

In the following detailed description of the invention, reference is had to the accompanying drawings which forms a part hereof. Like numerals refer to like parts in all views of the drawings and throughout the description.

In the drawings:

Fig. 1 is a perspective view illustrating the improved vanity case withdrawn from the top of an automobile and ready for use.

Fig. 2 is a similar perspective view illustrating the appearance of the vanity case in the closed position.

Fig. 3 is an enlarged cross section through the case in the closed position taken on the line 3—3, Fig. 2.

Fig. 4 is a section through the automobile top illustrating the supporting structure in the folded position.

Fig. 5 is a detail view of a frame which may be employed for receiving the case in the automobile top.

The tops of enclosed automobiles usually comprise a roof separated from a ceiling by cross struts. This leaves a space of several inches between the inside top or ceiling and the outside top or roof of the automobile. In the present invention this space is used for containing the vanity case when in the closed position. In the drawings the inside top or ceiling is indicated at 10 and the outside top or roof at 11, with the supporting struts at 12.

The invention comprises a vanity case 13 provided with suitable partitions 14 which divide it into compartments for receiving toilet articles such as a comb, a brush, powder, rouge, lipstick, etc. Along one side of the case 13 a frame 15 is hinged to carry a mirror 16. Foldable braces 17 extend between the frame 15 and the braces 17 to maintain the mirror in the upright position when in use. When not in use the mirror folds over the top of the container 14 to form a cover therefor.

To receive the case a box or recess 18 is formed in the automobile top. The edges of the ceiling material 10 may be turned inwardly around the recess 18, as illustrated or covered by means of braid or gimp as indicated at 19.

On each side of the recess 18 a guide plate 20 is secured and on each side of the vanity case similar guide plates 21 are secured. A pair of lazy tongs 22 extend between the guide plates 20 and 21 at each side of the vanity case 13. At each extremity of each lazy tongs one of the legs is pivoted as shown at 23. The other leg is carried on a pivot which travels in a slot 24 in the plate.

It can be seen that by this construction the vanity case 13 can be readily lowered from or raised into the recess 18. When in the raised position the legs of the lazy tongs fold against each other as indicated in Fig. 4. When in the extended position they appear as illustrated in Fig. 1.

To maintain the case in the raised position I provide spring latches 25 which extend outwardly from the forward and rearward faces of the vanity case 13 and engage in openings 26 formed in the sides of the recess 18. The spring latches comprise a bent piece of spring material secured at one extremity to the sides of the vanity case and terminating at their other extremity in finger hooks 27. The latches 25 pass under a false bottom 28 in the case 13. The finger hooks 27 terminate in an escutcheon 29 on the bottom of the case 13.

By engaging the finger hooks 27 between the thumb and first finger they can be compressed toward each other so as to withdraw the latches from the openings 26 and allow the vanity case to be lowered. When in the raised position the latches 25 are constantly forced outwardly by their inherent elasticity so as to wedge the case solidly in its recess and prevent vibration or rattling.

If desired, a frame such as illustrated at 30, Fig. 5, may be placed in the auto top to receive the case. The frame 30 is provided with a flange 31 which will overlap the ceiling 10 and form a finished edge for the recess.

Elongated slots 32 are formed in the frame 30 to receive the sliding pivots of the lazy tongs 22 and openings 33 are provided for the reception of the stationary pivots thereof. The frame also carries openings 34 in which the latch members 25 may engage.

The invention can be placed at any desired point in the automobile. It is preferred, however, to place it in the center of the car immediately in front of the rear seat so that the rear seat passengers can make use of the vanity case without leaving their seats.

The case can be made any desired size. If desired, a relatively large case can be designed for use by all of the car occupants, or several smaller cases may be used and positioned in front of each passenger's position.

It will be noted that the cross brace construction of the lazy tongs holds the mirror and case rigidly in position when in use.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An automobile vanity case comprising: a container; lazy tongs secured to said container and extending upwardly therefrom; and means for securing said lazy tongs to the underside of the top of an automobile, said means comprising: plates secured in the sides of a recess in said underside and hinged to said tongs so that the container will pass into said recess.

2. The combination with an automobile top having a recess in its underside, of a container and foldable supports for said container arranged to allow the latter to enter said recess, said foldable supports comprising: lazy tongs pivoted to the sides of said container and recess.

In testimony whereof, I affix my signature.

WILLIAM H. KELLY.